United States Patent
Yano et al.

(10) Patent No.: US 7,133,344 B2
(45) Date of Patent: **\*Nov. 7, 2006**

(54) DISK RECORDING-PLAYBACK DEVICE

(75) Inventors: Hideaki Yano, Osaka (JP); Kenji Asano, Kakamigahara (JP); Takanori Kishida, Ogaki (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 206 days.

This patent is subject to a terminal disclaimer.

(21) Appl. No.: 10/466,327

(22) PCT Filed: Jan. 28, 2002

(86) PCT No.: PCT/JP02/00611

§ 371 (c)(1),
(2), (4) Date: Dec. 30, 2003

(87) PCT Pub. No.: WO02/061743

PCT Pub. Date: Aug. 8, 2002

(65) Prior Publication Data

US 2004/0114482 A1    Jun. 17, 2004

(30) Foreign Application Priority Data

Jan. 30, 2001   (JP) .............................. 2001-022438

(51) Int. Cl.
*G11B 7/00*   (2006.01)

(52) U.S. Cl. ............................... 369/53.26; 369/13.24; 369/13.26

(58) Field of Classification Search ............. 369/53.26, 369/13.24, 13.26
See application file for complete search history.

(56) References Cited

U.S. PATENT DOCUMENTS 5,796,704 A * 8/1998 Nanba et al. ............. 369/53.12
6,519,212 B1 * 2/2003 Ashinuma ................. 369/13.26

FOREIGN PATENT DOCUMENTS

| JP | 1-158648 | 6/1989 |
|----|----------|--------|
| JP | 01-158648 | 6/1989 |
| JP | 03-116566 | 5/1991 |

(Continued)

OTHER PUBLICATIONS

Japanese Office Action dated Jun. 7, 2005.

*Primary Examiner*—Wayne Young
*Assistant Examiner*—Van T. Pham
(74) *Attorney, Agent, or Firm*—Armstrong, Kratz, Quintos, Hanson & Brooks, LLP

(57) ABSTRACT

A disk recording-playback device including a laser drive circuit for feeding a drive signal to an optical head and adjusting the power of a laser beam irradiated by the optical head, an error correcting circuit for detecting an error rate of a reproduced signal, and a system controller for controlling operation of the laser drive circuit for signal reproduction and signal recording based on the output of the error correcting circuit. The system controller successively sets the laser powers to at least three different values, obtains evaluation data for each laser power, approximates the relationships between the laser powers and the evaluation data to a quadratic curve, whereby an optimum laser power is derived corresponding to a vertex of the quadratic curve. Accordingly the optimum reproduction power and recording power are set, to thereby record and reproduce signals with high accuracy.

1 Claim, 16 Drawing Sheets

FOREIGN PATENT DOCUMENTS

| | | |
|---|---|---|
| JP | 3-116566 | 5/1991 |
| JP | 08-221760 | 8/1996 |
| JP | 8-221760 | 8/1996 |
| JP | 11-273073 | 10/1999 |
| JP | 11-273078 | 10/1999 |
| JP | 2002-25066 | 1/2002 |

* cited by examiner

FIG. 5

MANAGEMENT TABLE

| TEMPERATURE | Pr | Pw | TestRw | INTER-POLATED | EXPERI-ENCED |
|---|---|---|---|---|---|
| ... | | | | | |
| 15 | Pr15 | Pw16 | | | |
| 16 | Pr16 | Pw17 | | | |
| 17 | Pr17 | Pw18 | 0 | 0 | 0 |
| 18 | Pr18 | Pw19 | 0 | 0 | 0 |
| 19 | Pr19 | Pw20 | 0 | 0 | 0 |
| 20 | Pr20 | Pw21 | 1 | 0 | 1 |
| 21 | Pr21 | Pw22 | 0 | 1 | 1 |
| 22 | Pr22 | Pw23 | 0 | 1 | 1 |
| 23 | Pr23 | Pw24 | 0 | 1 | 1 |
| 24 | Pr24 | Pw25 | 0 | 1 | 1 |
| 25 | Pr25 | Pw26 | 0 | 1 | 1 |
| 26 | Pr26 | Pw27 | 1 | 0 | 1 |
| 27 | Pr27 | Pw28 | 0 | 1 | 1 |
| 28 | Pr28 | Pw29 | 0 | 1 | 1 |
| 29 | Pr29 | Pw30 | 0 | 1 | 1 |
| 30 | Pr30 | Pw31 | 0 | 1 | 1 |
| 31 | Pr31 | Pw32 | 0 | 1 | 1 |
| 32 | Pr32 | Pw33 | 1 | 0 | 1 |
| 33 | Pr33 | Pw34 | 0 | 1 | 1 |
| 34 | Pr34 | Pw35 | 0 | 1 | 1 |
| 35 | Pr35 | Pw36 | 0 | 1 | 1 |
| 36 | Pr36 | Pw37 | 0 | 1 | 1 |
| 37 | Pr37 | Pw38 | 0 | 1 | 1 |
| 38 | Pr38 | Pw39 | 1 | 0 | 1 |
| 39 | Pr39 | Pw40 | 0 | 0 | 0 |
| 40 | Pr40 | Pw41 | 0 | 0 | 0 |
| 41 | Pr41 | Pw42 | 0 | 0 | 0 |
| 42 | Pr42 | Pw43 | 0 | 0 | 0 |
| 43 | Pr43 | Pw44 | 0 | 0 | 0 |
| 44 | | | | | |
| 45 | | | | | |
| ... | | | | | |

FIG. 6

| TEMPERA-TURE [°C] | INITIAL VALUE | INITIATION TestRW AT 25°C | 1ST TIME TestRW AT 30°C | 2ND TIME TestRW AT 35°C | ... |
|---|---|---|---|---|---|
| 15 | 74 | 72 | 72 | 72 | |
| 16 | 73 | 71 | 71 | 71 | |
| 17 | 72 | 70 | 70 | 70 | |
| 18 | 71 | 69 | 69 | 69 | |
| 19 | 70 | 68 | 68 | 68 | |
| 20 | 69 | 67 | 67 | 67 | |
| 21 | 68 | 66 | 66 | 66 | |
| 22 | 67 | 65 | 65 | 65 | |
| 23 | 66 | 64 | 64 | 64 | |
| 24 | 65 | 63 | 63 | 63 | |
| 25 | 64 | 62 | 62 | 62 | |
| 26 | 63 | 61 | 61.40 | 61.40 | |
| 27 | 62 | 60 | 60.72 | 60.72 | |
| 28 | 61 | 59 | 59.98 | 59.98 | |
| 29 | 60 | 58 | 59.18 | 59.18 | |
| 30 | 59 | 57 | 59 | 59 | |
| 31 | 58 | 56 | 58 | 57.20 | |
| 32 | 57 | 55 | 57 | 55.56 | |
| 33 | 56 | 54 | 56 | 54.05 | |
| 34 | 55 | 53 | 55 | 52.64 | |
| 35 | 54 | 52 | 54 | 50 | |
| 36 | 53 | 51 | 53 | 49 | |
| 37 | 52 | 50 | 52 | 48 | |
| 38 | 51 | 49 | 51 | 47 | |
| 39 | 50 | 48 | 50 | 46 | |
| 40 | 49 | 47 | 49 | 45 | |
| 41 | 48 | 46 | 48 | 44 | |
| 42 | 47 | 45 | 47 | 43 | |
| 43 | 46 | 44 | 46 | 42 | |
| 44 | 45 | 43 | 45 | 41 | |
| 45 | 44 | 42 | 44 | 40 | |

PRIOR ART

DISK RECORDING-PLAYBACK DEVICE

BACKGROUND OF THE INVENTION

1. Field of the Invention

The present invention relates to disk recording-playback devices for recording signals on disks or reproducing signals-from the disks by irradiating the disk with a laser beam from an optical head.

2. Description of the Related Art

For use as recording media in such disk recording-playback devices, magneto-optical disks have been developed which permit rewriting and have a great memory capacity and high reliability. Such disks have found wide use as external memories in computers and audio visual devices. Developed especially in recent years are techniques for achieving improved recording densities by forming lands 17 and grooves 18 alternately on the signal bearing surface of a magneto-optical disk 1 as shown in FIG. 20 and recording signals on both the land 17 and the groove 18.

The lands 17 and the grooves 18 are wobbled as illustrated, and the wobbling frequency is a predetermined center frequency as frequency-modulated. A wobble signal is detected by signal reproduction, and the rotation of the magneto-optical disk is so adjusted that the wobble signal has the center frequency at all times, whereby constant linear velocity control is realized. Various items of information (wobble information) such as address information are contained in the wobble signal which is frequency-modulated as stated above. Various control operations are realized based on the wobble information at the time of signal reproduction.

With the disk recording-playback device of a laser-pulsed magnetic field modulation type, a laser beam is projected onto the disk for signal reproduction, and a laser beam is also projected onto the disk for signal recording, and the disk is heated locally. Furthermore, with magneto-optical disks using magnetic super resolution, signal reading is started whereupon the temperature in a beam spot region reaches a predetermined value while laser power for signal reproduction is increased. The laser power for signal reproduction is set lower than the laser power for signal recording, so that there is no likelihood that the recorded signals are damaged along with signal reproduction.

With the disk recording-playback device, power (recording power) of the laser beam for signal recording and power (reproduction power) of the laser beam for signal reproduction have optimum values, respectively. If a power differs from the optimum value, a bit error rate of the reproduced signal increases. If the bit error rate exceeds a given specified value, difficulty is encountered in performing a normal reproduction operation (see FIG. 14). Accordingly, already proposed is a method for, in the system's initiation into operation, reproducing signals and calculating the error rate while the reproduction power is gradually altered, or recording signals and calculating the error rate of the reproduction signal while the recording power is gradually altered for test tracks pre-provided on the disk, and thereby retrieving an optimum reproduction power and a recording power having the lowest error rate.

However, with the disk recording-playback device, the step width in the alteration of the reproduction power and the recording power is required to be set as small as possible in order to retrieve the optimum reproduction power and the optimum recording power with high accuracy, with the result that a long period of time is required for the retrieval, entailing the problem that the device's initiation into operation takes much time.

An object of the present invention is to provide a disk recording-playback device which is capable of jumping to signal recording or to signal reproduction in a short period of time and recording and reproducing signals with high accuracy at all times by setting the optimum reproduction power and recording power for each disk.

SUMMARY OF THE INVENTION

The present invention provides a disk recording-playback device which comprises a laser drive circuit for feeding a drive signal to an optical head and adjusting the power of a laser beam irradiated by the optical head, an evaluation data detecting circuit for detecting evaluation data representing quality of a signal reproduction state, a control circuit for controlling operation of the laser drive circuit based on an output of the evaluation data detecting circuit. The control circuit comprises:

calculation processing means for setting the laser powers to at least three different values successively, obtaining evaluation data for each laser power and approximating the relationships between the laser powers and the evaluation data at the three points to a quadratic curve, and thereby deriving an optimum laser power corresponding to a vertex of the quadratic curve, laser power control means for preparing a laser power control signal so as to make the optimum laser power a target value and feeding the signal to the laser drive circuit. Usable as the evaluation data is, for example, the frequency of occurrence of a bit error included in the reproduced signal, i.e. error rate.

In recording or reproducing a signal to a disk, the disk recording-playback device of the present invention, at first, determines the optimum laser power for the disk. For example, test tracks pre-provided on the disk are used in determining the optimum laser power for signal recording. The signals are recorded to the test tracks with different laser powers, and thereafter signal reproduction is performed with an appropriate laser power, to detect the error rate of the reproduced signal. Thus the relationship between the laser power (recording power) and the error rate at each of the three points P1, P2 and P3 is plotted, as shown in FIG. 16.

The relationships between the recording powers and the error rates can be approximately illustrated by a quadratic curve. When the coordinates of at least three points are decided, the quadratic curve is uniquely determined. The quadratic curve can be decided by using the values of laser power and error rate at the three points P1, P2 and P3, as stated above. The laser power corresponding to the vertex of the quadratic curve is the optimum laser power Pwo for minimizing the error rate, as shown in FIG. 16. The control circuit prepares, for signal recording, a laser power control signal so as to make the optimum laser power Pwo a target value to feed the signal to the laser drive circuit. As a result, signal recording is performed with the optimum laser power, obtaining a reproduced signal having an error rate sufficiently lower than a prescribed value for the subsequent signal reproduction.

All the error rates of the three points for determining the quadratic curve are not required to be lower than the prescribed value. A given value can be set as a laser power, so that the conventional retrieving processing is not completely necessary.

Stated specifically the control circuit optimizes the laser power for signal reproduction, and thereafter optimizes the laser power for signal recording by the calculation processing means and the laser power control means. In this case, in order to optimize the laser power for the signal reproduction, the control circuit comprises retrieving means for retrieving a lower limit value having a smaller value from two limit values of the laser power wherein evaluation data is beyond a predetermined allowable value, and means for determining the optimum laser power based on the lower limit value retrieved. The means for determining the optimum laser power determines the optimum laser power by adding a predetermined value to the lower limit value retrieved or by multiplying the retrieved lower limit value by a predetermined value.

According to the specific construction stated above, the laser power for reproduction is optimized based on the principle which will be described below. In signal reproduction, the variations in reproduction power alter the error rates of the reproduced signals in a quadratic curve, for example, as shown in FIG. 15. On a characteristics curve illustrated in a solid line, the optimum reproduction power Pr wherein the error rate is minimum value is present, for example. The laser power for signal reproduction is required to be set between the two limit values wherein the error rate is smaller than a prescribed value, i.e. between the lower limit reproduction power Prmin and the upper limit reproduction power Prmax. Similarly in signal recording, the optimum recording power Pw wherein the error rate is minimum is present. The laser power for signal recording is required to be set between the two limit values wherein the error rate of the reproduction signal is smaller than a prescribed value, i.e. between the lower limit recording power Pwmin and the upper limit recording power Pwmax.

FIG. 17 shows the range of the reproduction power Pr and the recording power Pw wherein the error rates are smaller than the prescribed values, respectively. It is thought that there will be no trouble in signal reproduction and recording if the reproduction power Pr and the recording power Pw are each set to a given value within this range. The reproduction power and the recording power are, however, preferably set at central possible positions within the range since the characteristics shown in FIG. 17 vary due to disk warp and the like. Usable as a method for optimizing the reproduction power, for example, is to calculate the average value of the lower limit reproduction power Prmin and the upper limit reproduction power Prmax wherein the error rates are smaller than the prescribed value, respectively, and to determine the calculated result as the optimum reproduction power.

However, the reproduction power Pr wherein the error rate is smaller than the prescribed value is dependent on the recording power Pw wherein the error rate is smaller than the prescribed value, as described in FIG. 17. While the recording power Pw is in the range of 6.5 mW to 8.0 mW, for example, a limit reproduction power Pr wherein the error rate is smaller than the prescribed value varies in accordance with the recording power. Accordingly in the case where, within the range of this recording power, the optimum reproduction power is determined as the average value of the lower limit reproduction power Prmin and the upper limit reproduction power Prmax wherein the error rates are smaller than the prescribed values, respectively, the value of the optimum reproduction power deviates from the center position of the range shown in FIG. 17. Since the variations in the characteristics shown in FIG. 17 greatly shift the reproduction power from the optimum value, it is likely that the error rate is beyond the prescribed value.

According to the specific construction described, in order to set the reproduction power and the recording power to values provided at possible central positions within the range shown in FIG. 17, when the reproduction power is optimized, the optimum reproduction power is calculated by firstly retrieving the lower limit reproduction power Prmin wherein the error rate is smaller than the prescribed value and thereafter adding a predetermined value to the retrieved lower limit reproduction power Prmin. Usable as the predetermined value are the values within the area wherein the reproduction power is not dependent on the recording power in the relationship shown in FIG. 17, i.e., 0.36 mW: one half of the difference between the maximum reproduction power 2.56 mW and the minimum reproduction power 1.84 mW wherein the recording power is greater than 8.0 mW or values close to 0.36 mW (for example, 0.4 mW). Consequently obtained for the reproduction power is the optimum value which is not dependent on the recording power.

As shown in FIG. 15, even if the optimum value for the reproduction power changes from Pr to Pr' or to Pr" since the variation characteristics of the error rate relative to the reproduction power vary from a solid line to a broken line or to a chain line, the lower limit reproduction power Prmin changes to Prmin' or to Prmin", and the difference between the optimum value Pr, Pr' or Pr", and the lower limit reproduction power Prmin, Prmin' or Prmin", respectively, is an approximately constant value N. Accordingly, the accurate optimum reproduction power Pr, Pr' or Pr" can be determined by adding the difference N to the lower limit reproduction power Prmin, Prmin' or Prmin", respectively. Furthermore, the accurate optimum reproduction power Pr, Pr' and Pr" can also be determined by multiplying the lower limit reproduction power Prmin by a predetermined value $\alpha$ instead of adding the predetermined value N to the lower limit reproduction power Prmin.

As described above, the disk recording-playback device of the present invention can jump to signal recording or to signal reproduction in a short period of time, and record and reproduce signals with high accuracy at all times by setting the optimum reproduction power and recording power for each disk.

BRIEF DESCRIPTION OF THE DRAWINGS

FIG. 5 includes a diagram for illustrating data structure of the management table.

FIG. 6 is a diagram illustrating an example of the updated management table.

BEST MODE OF CARRYING OUT THE INVENTION

Figure 1:
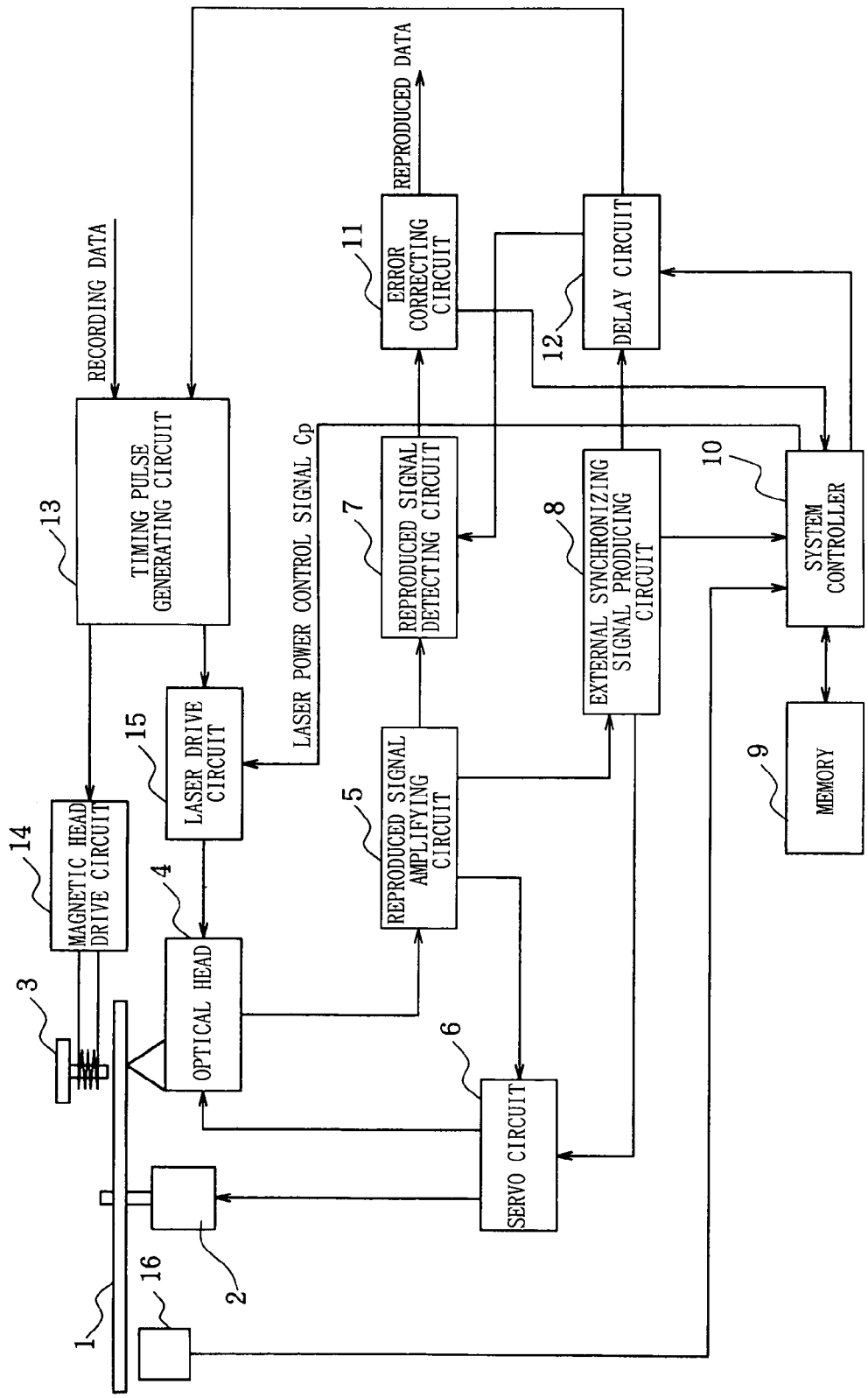
FIG. 1 is a block diagram showing the construction of a disk recording-playback device embodying the present invention.

With reference to the drawings, a detailed description will be given below of the present invention as embodied into disk recording-playback devices for use with magneto-optical disks serving as recording media. FIG. 1 shows a disk recording-playback device embodying the invention and comprising a spindle motor 2 for rotatingly driving a magneto-optical disk 1. A temperature sensor 16 is provided in the vicinity of the magneto-optical disk 1.

The device has a signal reproduction system comprising a laser drive circuit 15, optical head 4, reproduced signal amplifying circuit 5, reproduced signal detecting circuit 7 and error correcting circuit 11. For signal reproduction, the optical head 4 is driven by the laser drive circuit 15 to irradiate the disk 1 with a laser beam. On the other hand, the device has a signal recording system comprising a magnetic head drive circuit 14 and a magnetic head 3. For signal recording, the laser drive circuit 15 and the optical head 4 operate for heating the disk 1 locally. The device further has a control system comprising a servo circuit 6, external synchronizing signal producing circuit 8, system controller 10, memory 9, delay circuit 12 and timing pulse generating circuit 13.

The optical head 4 projects a laser beam onto the disk 1, and detects the reflected beam as an optical signal and a magneto-optical signal. The amplifying circuit 5 amplifies the optical signal and magneto-optical signal obtained by the optical head 4 and then feeds a focus error signal and a tracking error signal contained in the optical signal to the servo circuit 6. The amplifying circuit 5 also feeds an optical signal, which is detected due to discrete regions provided at a constant interval in the grooves of the disk 1, to the external synchronizing signal producing circuit 8 and the magneto-optical signal to the reproduced signal detecting circuit 7.

The circuit 8 produces an external synchronizing signal and feeds the signal to the servo circuit 6 and the delay circuit 12. In response to the focus error signal and tracking error signal, the servo circuit 6 executes focusing servo and tracking servo for an actuator (not shown) provided for the optical head 4, and also controls the rotation of the spindle motor 2 based on the external synchronizing signal.

The reproduced signal detecting circuit 7 feeds the detected reproduced signal to the error correcting circuit 11.

The circuit 11 demodulates the reproduced signal, detects errors from the reproduced signal thus obtained, corrects the errors, and outputs the reproduced data as corrected to the subsequent circuit. The delay circuit 12 prepares a synchronizing signal by delaying the phase of the external synchronizing signal by a predetermined time period and feeds the signal to the timing pulse generating circuit 13.

For signal recording, the timing pulse generating circuit 13 receives the data to be recorded and modulated by a specified method and the synchronizing signal from the delay circuit 12, prepares a pulse signal for applying an alternating magnetic field to the disk 1, feeds the signal to the magnetic head drive circuit 14, also prepares a pulse signal (write clock) for irradiating the disk 1 with a pulse beam and feeds the signal to the laser drive circuit 15. For signal reproduction, the reproduced signal detecting circuit 7 converts a reproduced analogue signal to a digital signal based on the synchronizing signal (read clock) from the delaying circuit 12.

The magnetic head drive circuit 14 prepares a drive signal for the magnetic head 3 based on the pulse signal from the timing pulse generating circuit 13. The magnetic head 3 applies an alternating magnetic field to the disk 1 based on the drive signal from the head drive circuit 14. The laser drive circuit 15 drives a semiconductor laser (not shown) provided on the optical head 4 based on the pulse signal from the timing pulse generating circuit 13. The optical head 4 produces a laser beam based on the drive signal from the laser drive circuit 15 and irradiates the disk 1 with the beam.

Based on the external synchronizing signal obtained from the signal producing circuit 8, the system controller 10 controls the operation of the delay circuit 12. Further the system controller 10 calculates the bit error rates based on the error correction information obtained from the error correcting circuit 11, and controls the operation of the laser drive circuit 15 in response to the result of the calculation. Furthermore, the system controller 10 accumulates in a management table of the memory 9 temperature data obtained from the temperature sensor 16 and the optimum read power and the optimum write power determined in test read and test write which will be described below, and controls the laser power by reference to the management table for signal reproduction and signal recording.

The laser drive circuit 15 adjusts the power of the laser beam irradiated from the optical head 4 for signal reproduction in response to a laser power control signal Cp to be fed from the system controller 10, as will be described below. As shown in FIG. 5, stored in the management table are, for each temperature, read power Pr, write power Pw, flag Test RW indicating whether test read/write has been executed, flag indicating whether the interpolation processing as will be described below has been performed, flag indicating whether a temperature concerned has actually been experienced.

Figure 2:
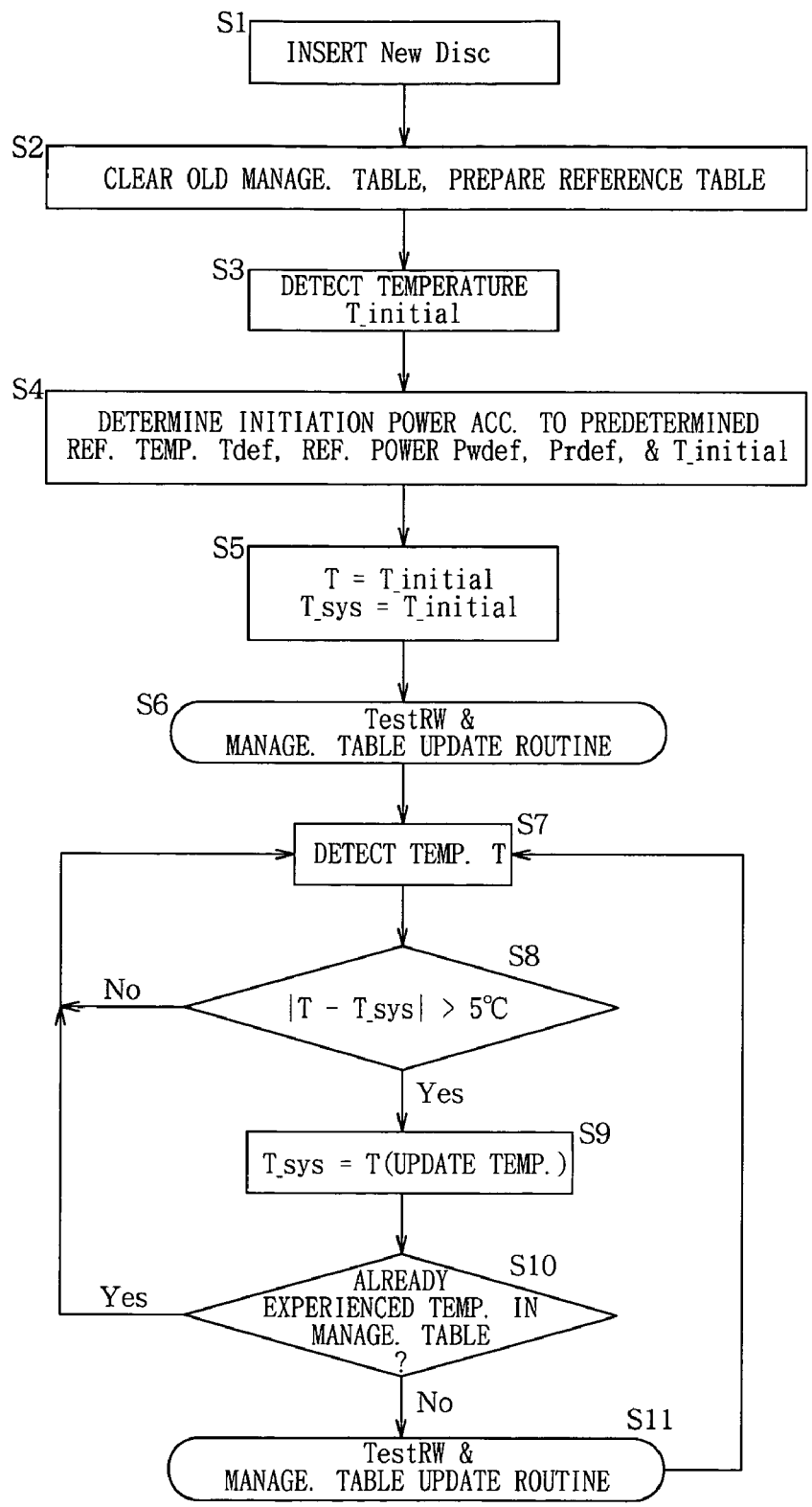
FIG. 2 is a flow chart showing a laser power control procedure for use in the device.

FIG. 2 shows the overall flow of a procedure to be executed by the system controller 10. First in step S1 a new magneto-optical disk is inserted. In step S2 an old management table is cleared, and thereafter a reference table wherein a reference value (initial value) of the relationship between temperature and laser power (Pr or Pw) is prescribed is prepared. Subsequently in step S3 an initial temperature T_initial is detected. In step S4 the laser power when the device is initiated into operation is determined according to a predetermined reference temperature Tdef, reference laser powers Pwdef and Prdef, and initial temperature T_initial.

Subsequently in step S5 the initial temperature T_initial is set to current temperature T and interior temperature held by the system. Then step S6 follows to execute the test read/write and update routine for the management table. In executing the test read/write and the update routine for the management table, the test read and test write are performed (Test RW) with use of predetermined test tracks, to calculate optimum laser powers Pr, Pw in step S21 as described in FIG. 3. In step S23 the laser powers Pr, Pw at temperature T prescribed in the management table are updated based on the calculation result.

Next step S24 follows to give a checking mark to a Test Rw term as for a temperature wherein the laser power is optimized. Then step S25 follows to derive, by interpolation processing, optimum laser powers Pr, Pw as for each of the temperatures between the two temperatures wherein checking marks are given to the Test Rw terms with use of the data on the two temperatures. Step S26 follows to give checking marks to the interpolation terms as for the temperatures given interpolation processing to complete the procedure for updating the management table.

Figure 7:
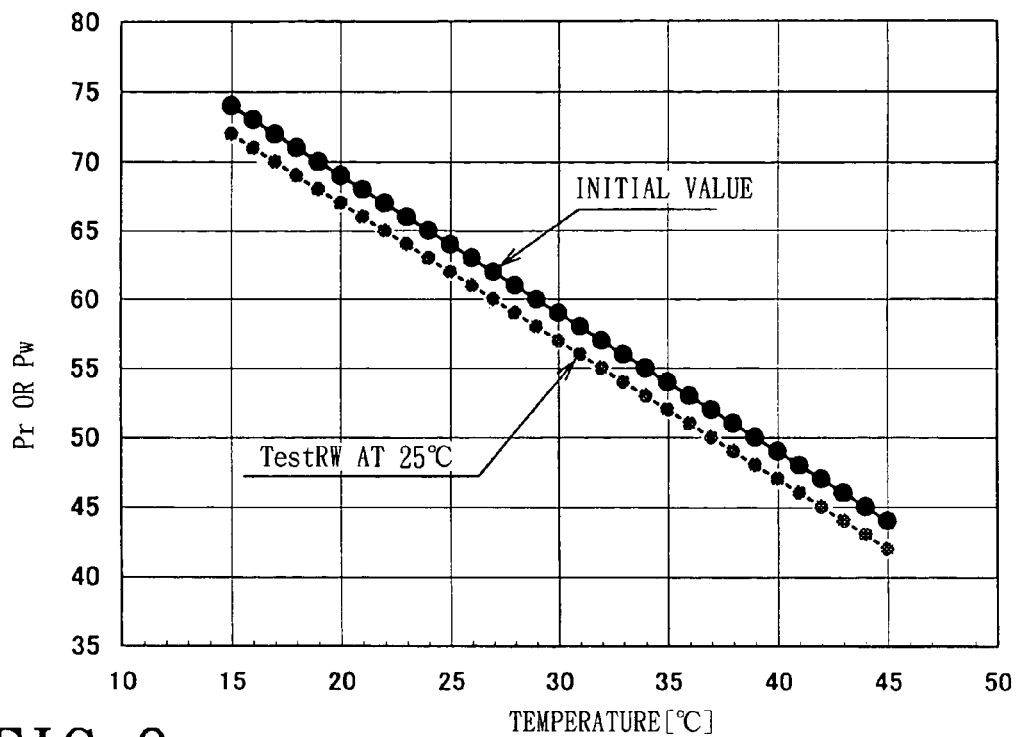
FIG. 7 is a graph showing the relationship between temperature and laser power of the management table when the device is initiated into operation.

As shown in FIG. 6, in the case where, for example, the relationship between a disk temperature and an initial temperature of laser power, i.e. slope (hereinafter referred to as temperature slope) of variations of laser power relative to disk temperature, is specified, when the temperature for operation initiation is 25° C., and the optimum laser power is "62" calculated after the test read/write, the initial value "64" is updated to "62". Subsequently, in the interpolation processing, the laser power at 25° C. is set to a base point, and the same value "2" is subtracted from each of the laser powers as for the other temperatures, whereby the interpolation is processed with the temperature slope held to update the management table. FIG. 7 shows an example wherein the relationship between the disk temperature and the initial value of the laser power is updated at 25° C. by the test read/write. Accordingly, the management table is updated as the temperature slope is held constantly.

Figure 3:
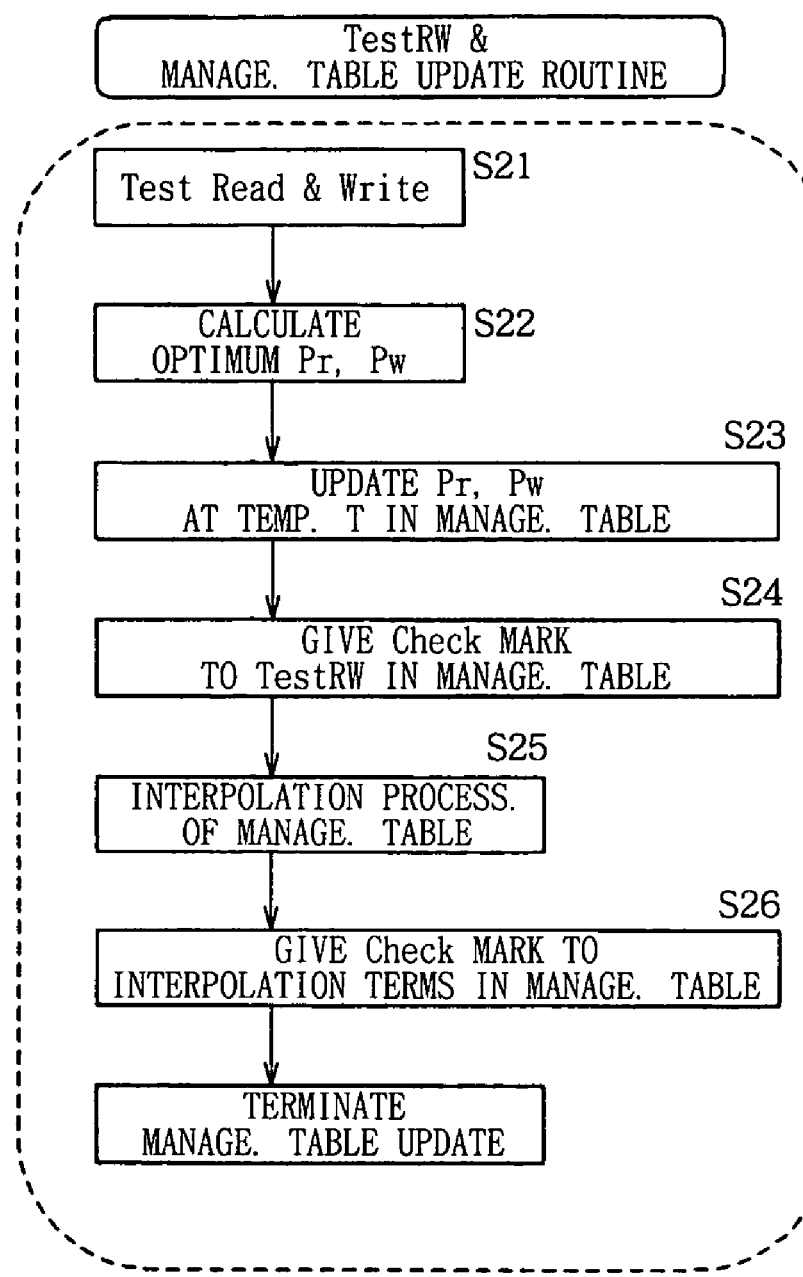
FIG. 3 is a flow chart of test read/write and an update routine for a management table.

Thereafter for normal reproduction, first in step S7 shown in FIG. 2 a disk temperature T is detected. In step S8 an inquiry is made as to whether the disk temperature is increased by 5° C. or more. When the answer is affirmative, step S9 follows to update a system temperature T_sys to the temperature T. Next in step S10 an inquiry is made as to whether the temperature has been already experienced in the management table. If the answer is negative, step S11 follows to execute test read/write and the management table updating routine as shown in FIG. 3.

Figure 8:
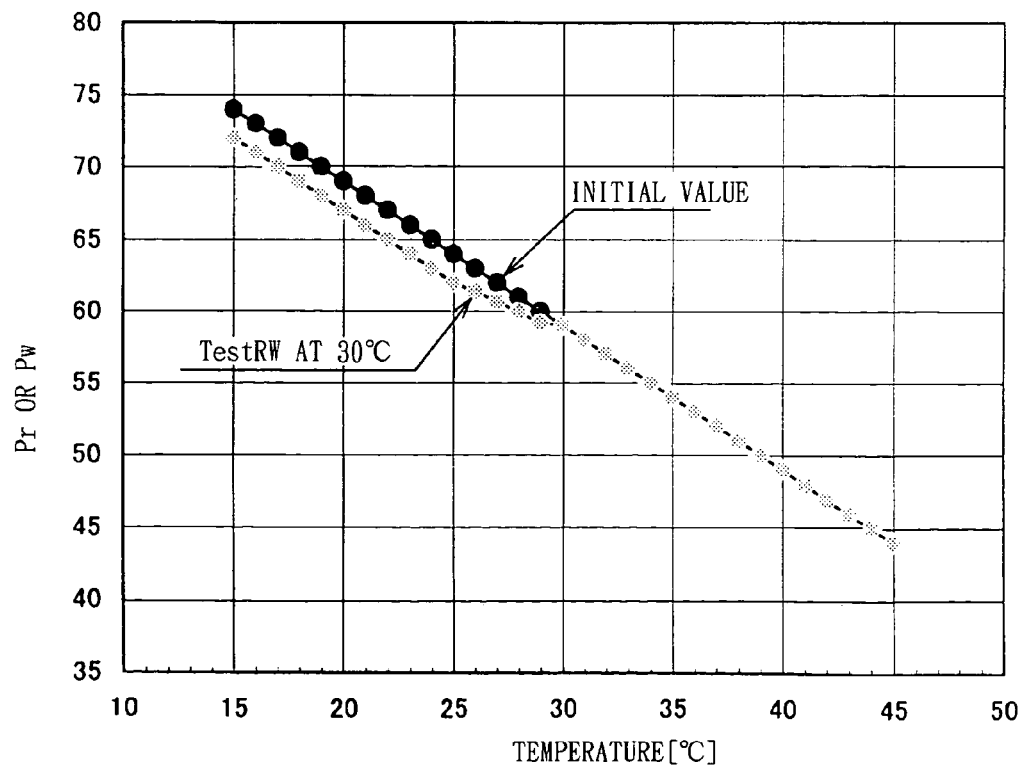
FIG. 8 is a graph showing the relationship between temperature and laser power of the management table in the first test read/write.

To take an example shown in FIG. 6, in the case where the test read/write is performed at 30° C. for the first time, when the optimum laser power determined by the test read/write is "59", the laser power "57" is updated to "59", laser powers as for the temperatures between 25° C. and 30° C. are determined by the interpolation processing (linear interpolation), in the temperature range of less than 25° C. and of greater than 30° C., the interpolation is processed so as to hold the temperature slope constant, and the management table is updated. FIG. 8 shows the state wherein the management table is updated by the above test read/write.

Figure 9:
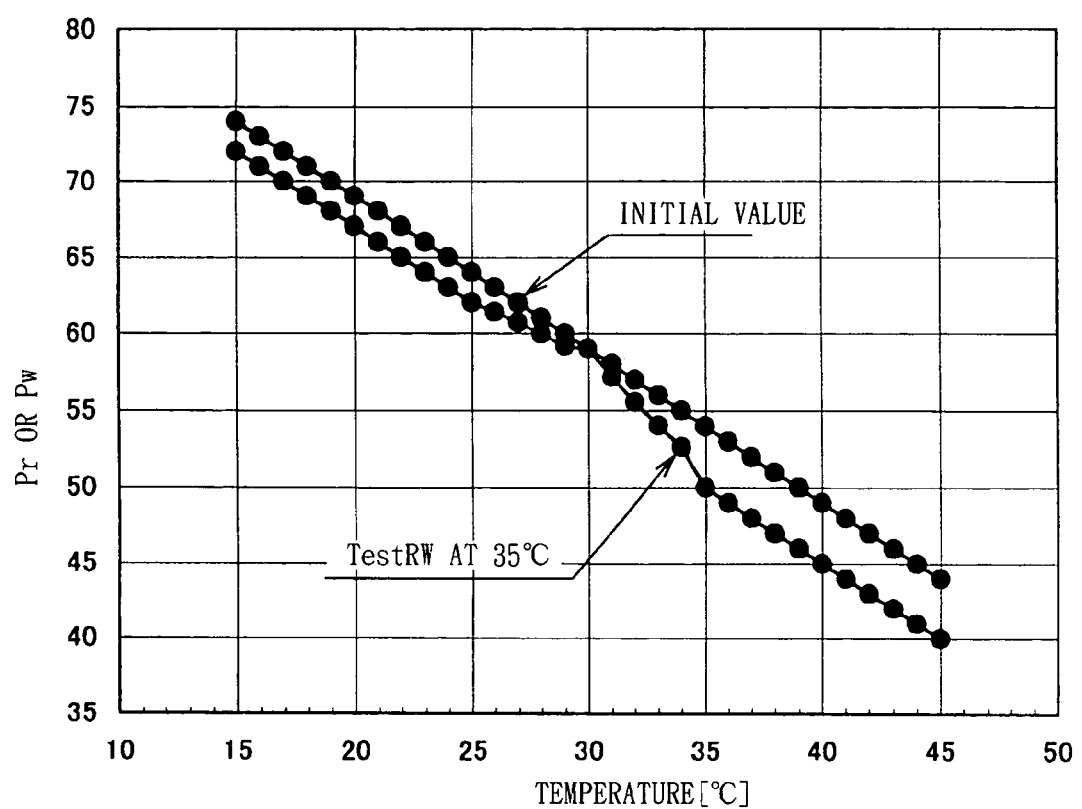
FIG. 9 is a graph showing the relationship between temperature and laser power of the management table in the second test read/write.

Furthermore, as shown in FIG. 6, in the case where the test read/write is performed at 35° C. for the second time, when the optimum laser power determined by the test read/write is "50", the laser power "54" is updated to "50", laser powers as for the temperatures between 30° C. and 35° C. are determined by the interpolation processing (linear interpolation), in the temperature range of greater than 35° C. the interpolation is processed so as to hold the temperature slope constant, and the management table is updated. FIG. 9 shows the state wherein the management table is updated by the above test read/write.

Accordingly whenever the temperature varies by 5° C. or more, the test read/write is executed, to determine the optimum laser power as for the temperature at that time, executing the interpolation processing with use of the data, to thereby update the management table. When all the experienced terms of the management table are given checking marks, the read power Pr and the write power Pw are set for the subsequent normal operation, by referring to the relationship between the temperature and the laser power stored in the management table, and the signals are recorded and reproduced.

Figure 4:
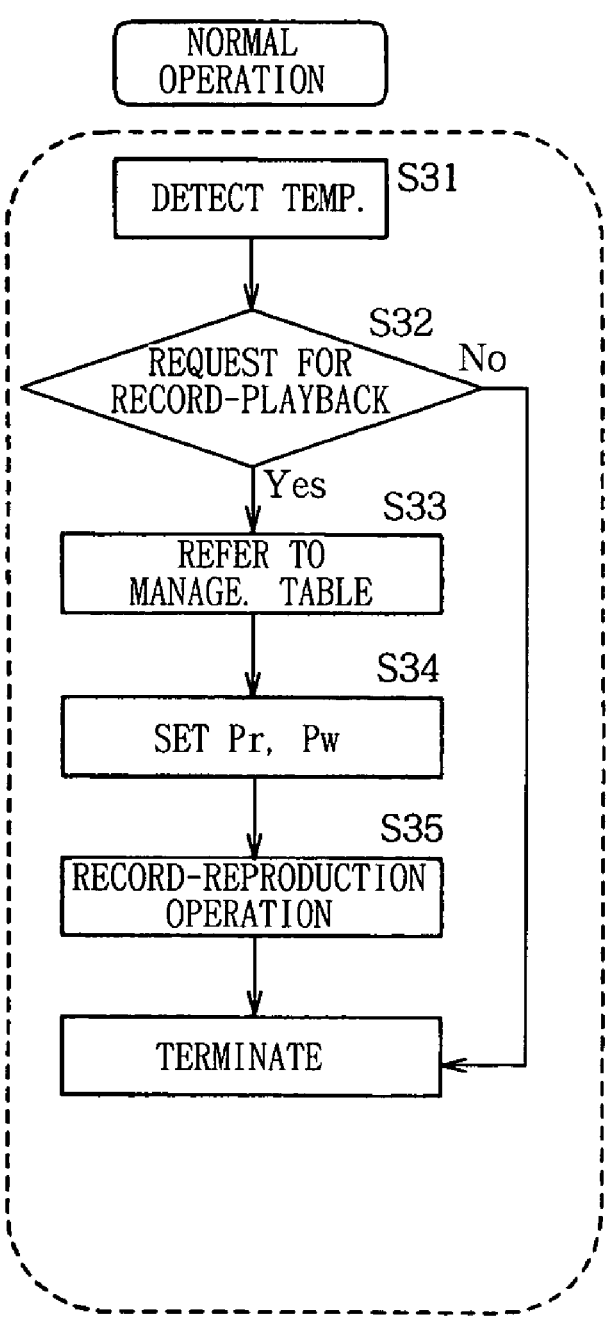
FIG. 4 is a flow chart showing a control procedure of a recording-playback operation for a normal operation.

Thus, for normal operation, in step S31 the disk temperature is detected, followed by step S32 wherein an inquiry is made as to whether a recording-playback request is made, as shown in FIG. 4. When the answer for step S32 is affirmative, step S33 follows to refer to the management table. In step S34 the laser powers Pr, Pw are set in accordance with the temperature concerned. In step S35 recording-playback operation is executed, to complete the procedure.

Figure 13:
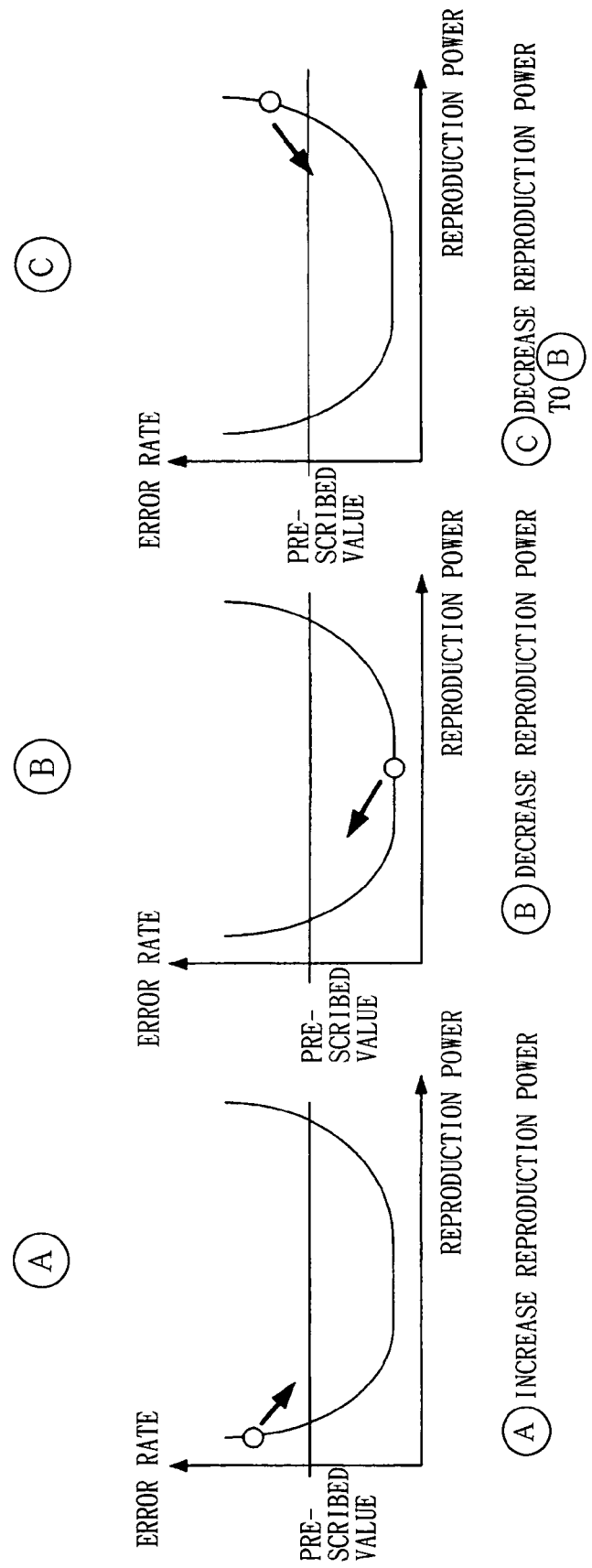
FIG. 13 is a graph showing a process for reproduction power optimization.
Figure 14:
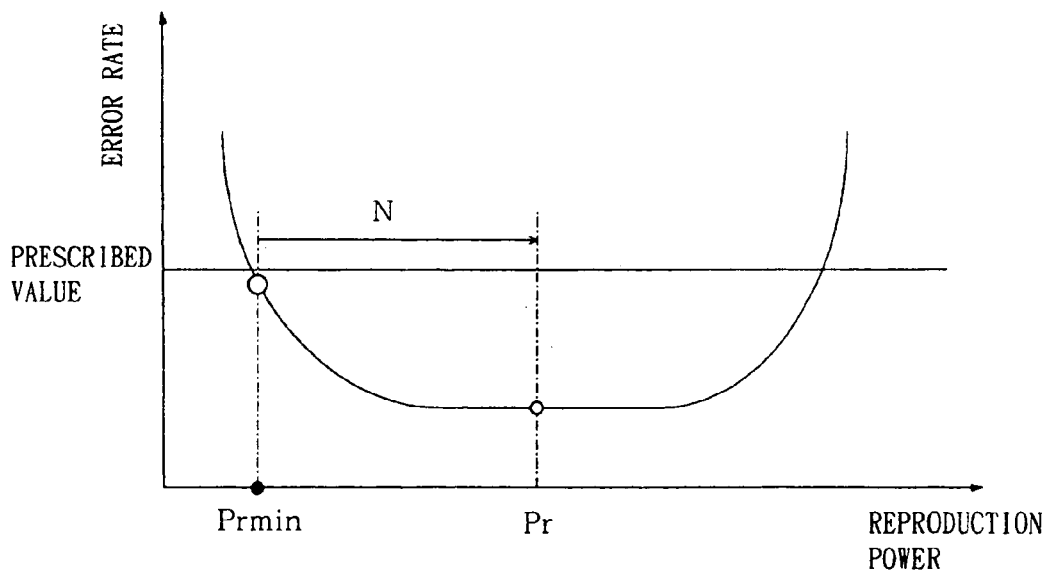
FIG. 14 is a graph showing the relationship between the reproduction power and the error rate.
Figure 15:
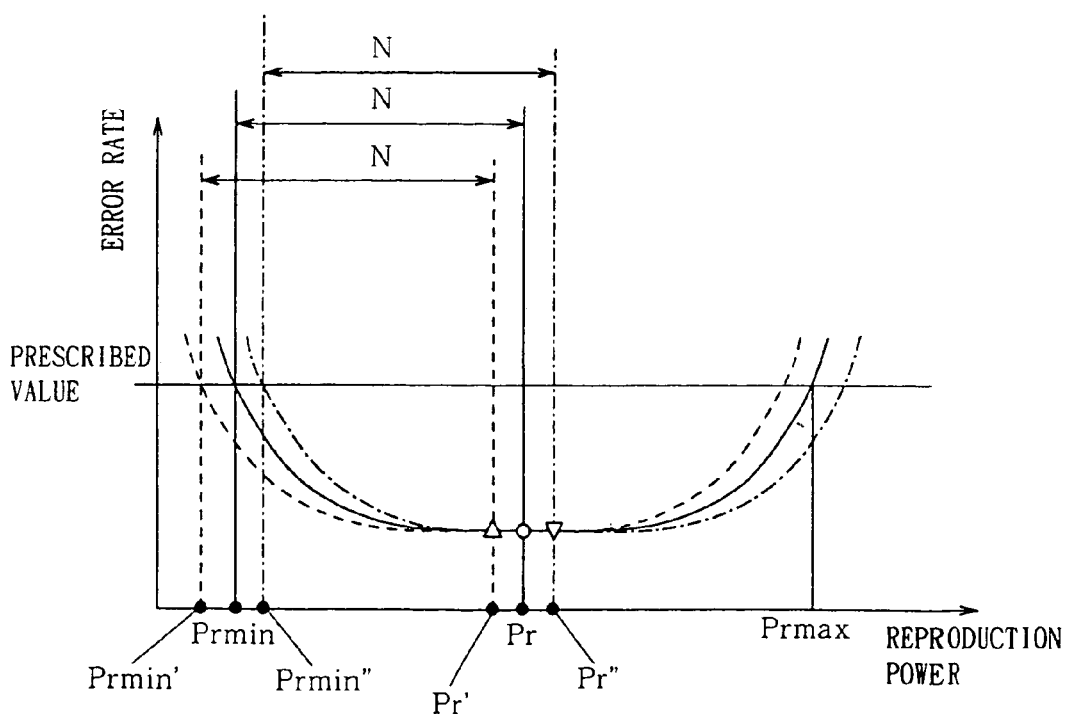
FIG. 15 is a graph illustrating the principle of the reproduction power optimization.

Next, a method for optimizing the reproduction power will be described as follows. The present example adopts a procedure shown in FIGS. 13 and 14 for retrieving a lower limit value Prmin having a smaller value from the two limit values of reproduction power wherein the error rate is smaller than the prescribed value in the test read for the determination of the optimum reproduction power. That is the three states shown in FIG. 13 are assumed, depending on the initial values of the reproduction power. When the reproduction power is smaller than the lower limit value as in the case of A, the reproduction power is increased. When the reproduction power is between the lower limit value and the upper limit value as in the case of B, the reproduction power is decreased. When the reproduction power is greater than the upper limit value as in the case of C, the reproduction power is decreased. Thus the reproduction power is altered to the lower limit value Prmin shown in FIG. 14 or values close to the lower limit value. Thereafter a predetermined value N is added to the reproduction power concerned, to thereby determine the optimum reproduction power Pr.

Figure 18:
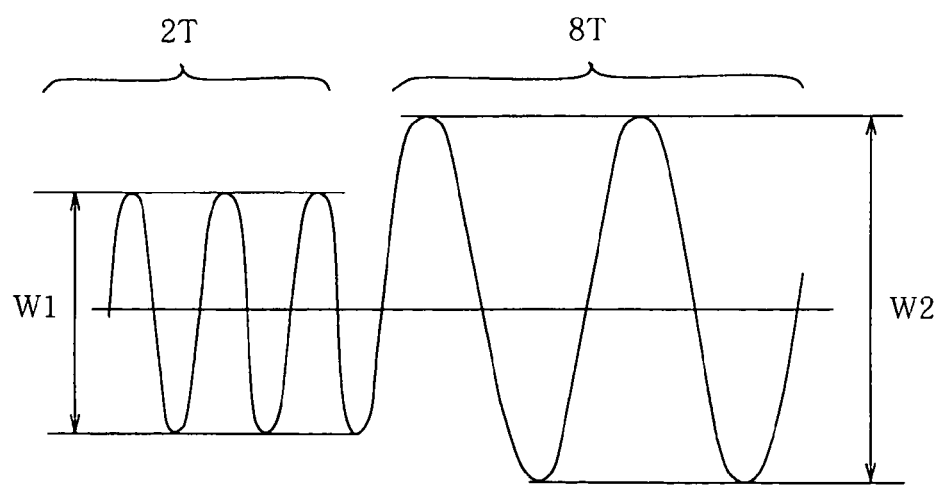
FIG. 18 is a waveform diagram of the two reference signals written in a header of the reproduced signal.
Figure 19:
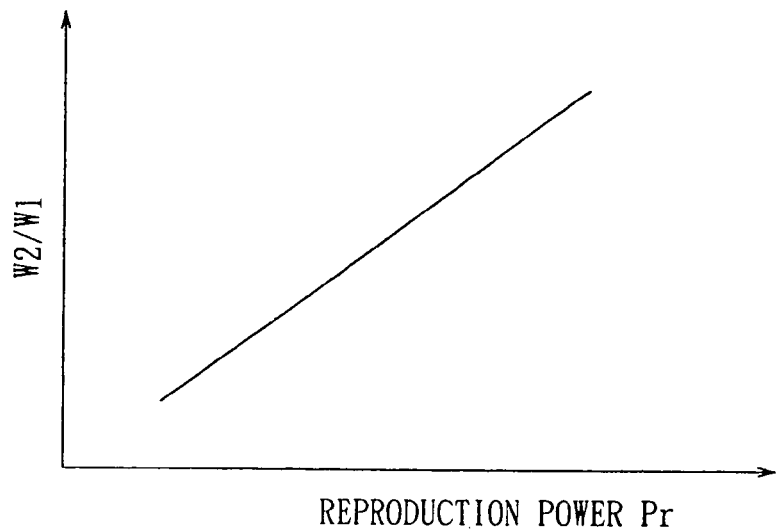
FIG. 19 is a graph showing the relationship between amplitude ratio of the reproduced signals of the two reference signals and the reproduced power.
Figure 20:
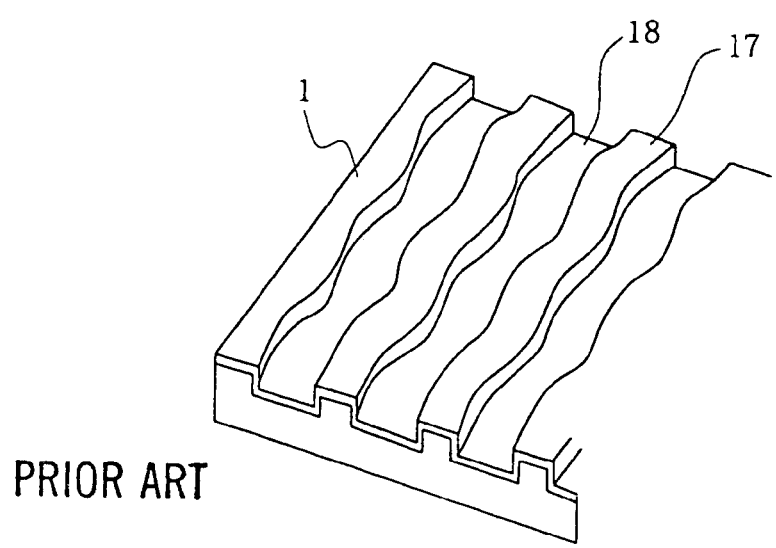
FIG. 20 is an enlarged perspective view of lands and grooves formed on a magneto-optical disk.

In order to distinguish the case A from the case C shown in FIG. 13, the present example adopts a procedure using a following principle. The signal recorded on the magneto-optical disk has data format wherein a plurality of frames are arranged in time-series. Each of the frames is provided with a header portion wherein a first reference signal of a single frequency having a short cycle (2T) and a second reference signal of a single frequency having a long cycle (8T) are recorded, as shown in FIG. 18. With reference to FIG. 19, the ratio (W2/W1) of amplitude W2 of the reproduced signal of the second reference signal to amplitude W1 of the reproduced signal of the first reference signal is increased as the reproduction power Pr rises. Consequently, when the ratio is smaller than a predetermined set value, the state is judged as A in FIG. 13. When the ratio is greater than a predetermined set value, the state is judged as C in FIG. 13.

Figure 10:
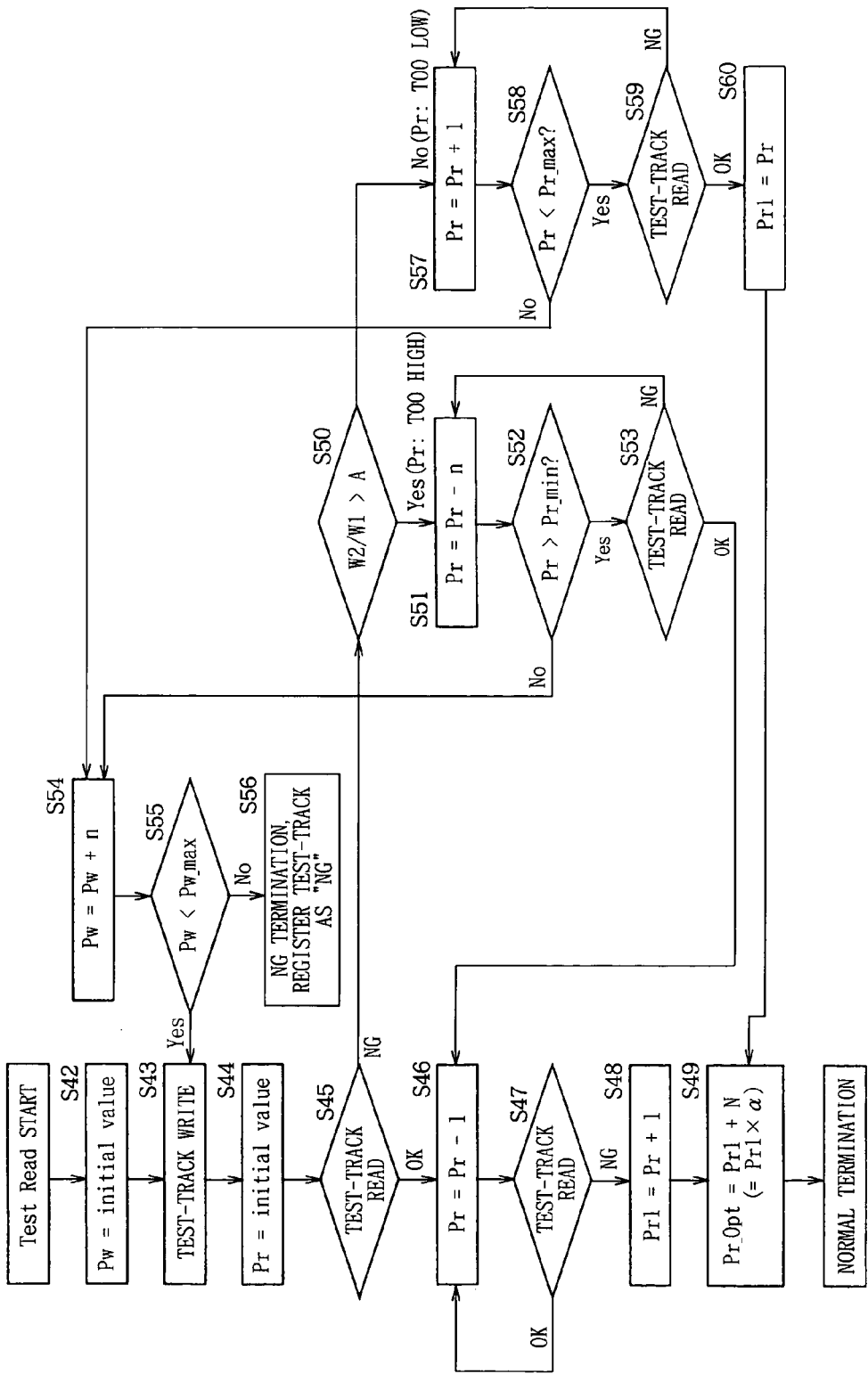
FIG. 10 is a flow chart showing a procedure for reproduction power optimization.

FIG. 10 shows a specific procedure for optimizing the reproduction power by the test read for the grooves of the test tracks precedently provided on the magneto-optical disk. First in step S42 shown in FIG. 10 an initial value is set as write power Pw. In step S43 recording is performed to the test tracks. Next in step S44 an initial value is set as reproduction power Pr. In step S45 the test tracks are reproduced, it is decided whether the reproduction is allowable depending on whether the error rate concerned is greater than a threshold value. When the reproduction is allowable, the current state is shown as FIG. 13 B, followed by step S46 wherein the reproduction power Pr is decreased by a unit power ("1"). Then in step S47 the test tracks are reproduced once again, and an inquiry is made as to whether the reproduction is allowable. Thereafter the sequence returns to step S46 to repeat the same procedure.

When the answer for step S47 is negative, the sequence proceeds to step S48 wherein the lower limit value Pr1 is determined by adding a unit power ("1") to the reproduction power Pr. In step S49 the optimum reproduction power Pr_opt is determined by adding a predetermined value N (=0.4 mW) to the lower limit reproduction power Pr1, to complete the procedure. In determining the optimum reproduction power Pr_opt, usable is a method wherein the lower limit reproduction power Pr1 is multiplied by a predetermined value $\alpha$. The predetermined value $\alpha$ can be set as a value dependent on the system.

On the other hand, when the reproduction is not allowable in step S45, the state concerned is shown as FIG. 13 A or C. Based on the principle described in FIGS. 18 and 19, it is judged which of FIG. 13 A or C shows the state concerned, i.e., in step S50 shown in FIG. 10 an inquiry is made whether the ratio (W2/W1) of the reference signals is greater than a set value A, to thereby recognize a direction to which the reproduction power will be changed. Instead of usage of the ratio (W2/W1) of reference signal, it is possible to recognize a direction to which the reproduction power will be changed depending on whether the difference (W2−W1) between the reference signals is greater than a set value.

When the answer for step S50 is affirmative, the state concerned is shown in FIG. 13 C, followed by step S51 wherein the reproduction power Pr is decreased by a predetermined value n. In step S52 an inquiry is made as to whether the reproduction power Pr is greater than a set lower limit value Pr_min. If the answer is affirmative, step S53 follows to reproduce the test tracks to judge whether the reproduction is allowable. When it is judged that the reproduction is not allowable in step S53, the sequence returns to step S51 to repeat the processing wherein the reproduction power Pr is decreased by the predetermined value n. When the reproduction is allowable in step S53, the state is changed to as in FIG. 13 B, followed by step S46 wherein the optimum reproduction power Pr_opt is determined according to the above procedure described, thereby completing the procedure.

When the answer for step S50 is negative, the state concerned is shown in FIG. 13 A, followed by step S57 wherein the reproduction power Pr is increased by a single unit power ("1"). In step S58 an inquiry is made as to whether the reproduction power Pr is smaller than a set upper limit value Pr_max. If the answer is affirmative, step S59 follows to reproduce the test tracks to judge whether the reproduction is allowable. When it is judged that the reproduction is not allowable in step S59, the sequence returns to step S57 to repeat the processing for increasing the reproduction power Pr. When the reproduction is allowable in step S59, step S60 follows to determine the reproduction power Pr at that time as a lower limit value Pr1, followed by step S49 wherein the optimum reproduction power Pr_opt is determined by adding a predetermined value N (=0.4 mW) to the lower limit reproduction power Pr1, to thereby complete the procedure.

When the answer for step S52 or S58 is negative, step S54 follows to increase the recording power Pw by a predetermined value n. Then step S55 follows to inquire whether the recording power Pw is smaller than a set upper limit value Pw_max. If the answer is affirmative, step S43 follows to write the test tracks. If the answer is negative, step S56 follows to produce a warning notice "NG" and register the test tack as "NG". With test read for lands of the test track, the optimum reproduction power Pr_opt can be determined according to the same procedure.

Figure 11:
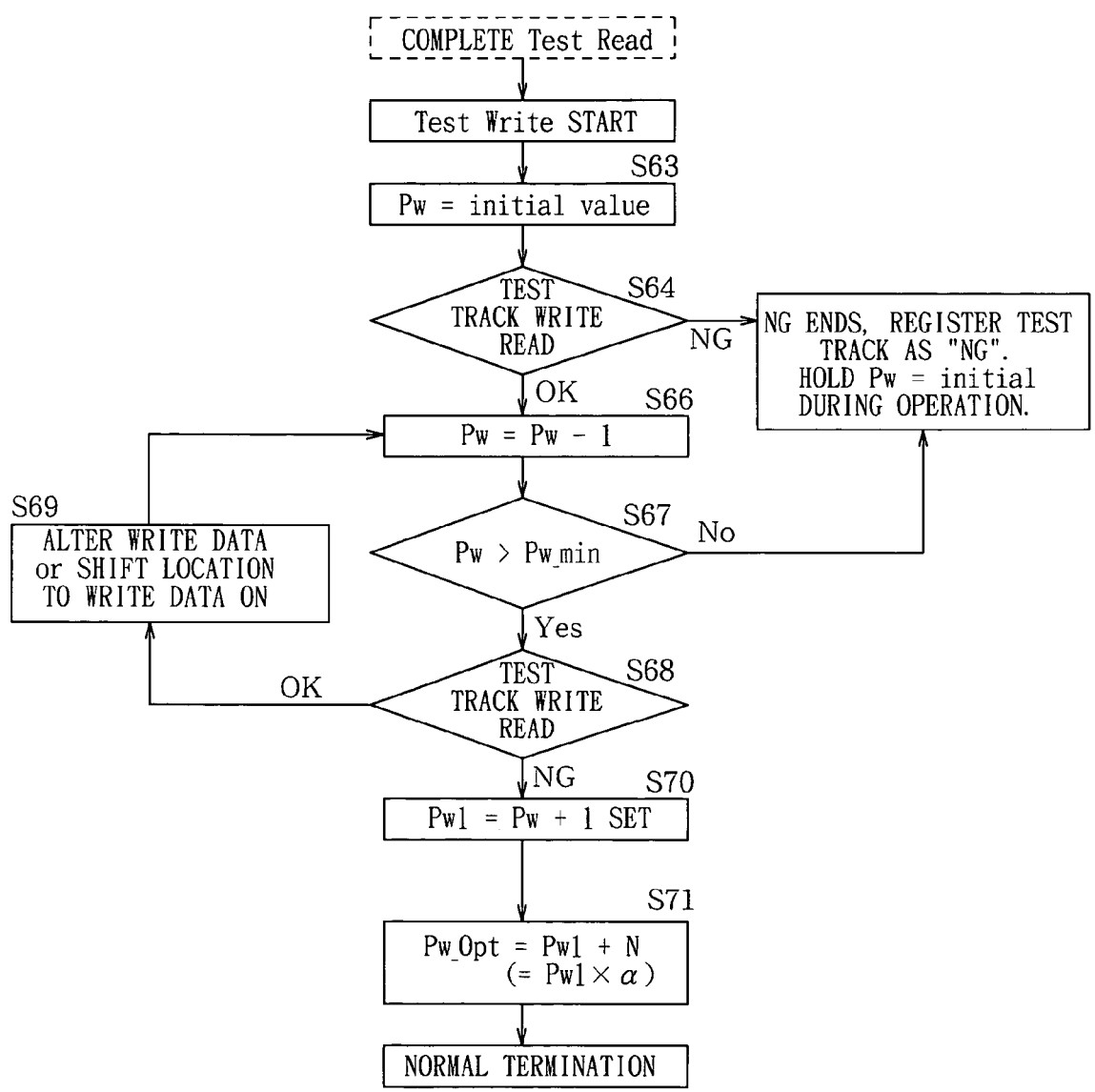
FIG. 11 is a flow chart showing a procedure for recording power optimization.

Furthermore, in determining the optimum recording power, usable is the same method as that for the reproduction power optimization as described above. FIG. 11 shows a specific procedure for the recording power optimization according to the method. When the test read is completed, an initial value of recording power which value is not optimum but recordable and the optimum reproduction power are determined, the recording power Pw is set to the initial value in step S63. In step S64 the recording and reproduction are performed for the test tracks, to judge whether the reproduction is allowable. When the reproduction is not allowable, step S65 follows to produce a warning notice "NG" and register the test tracks as "NG". During an operation state the recording power is held at the initial value.

On the other hand, when the reproduction is allowable in step S64, the recording power Pw is decreased by a single unit power ("1"). In step S67 an inquiry is made as to whether the recording power Pw is greater than a set lower limit value Pw_min. When the answer is negative, step S65 follows to produce a warning notice "NG" and register the test track as "NG". During an operation state, the recording power is held at the initial value. If the answer for step S67 is affirmative, the recording and reproduction are performed for the test tracks to judge whether the reproduction is allowable in step S68. When it is judged that the reproduction is allowable, step S69 follows to alter write data or to shift location to write data on. The sequence returns to step S66 to repeat a processing for decreasing the recording power.

Thereafter when it is judged that the reproduction is not allowable in step S68, step S70 follows to determine a lower limit value Pw1 by adding a single unit power "1" to the recording power Pw at that time. In step S71 an optimum recording power Pw_opt is determined by adding a predetermined value N to the lower limit recording power Pr1 to complete the procedure. In determining the optimum recording power Pw_opt, usable is a method wherein the lower limit recording power Pw1 is multiplied by a predetermined value $\alpha$. The predetermined value $\alpha$ can be determined as a value dependent on the system.

Figure 16:
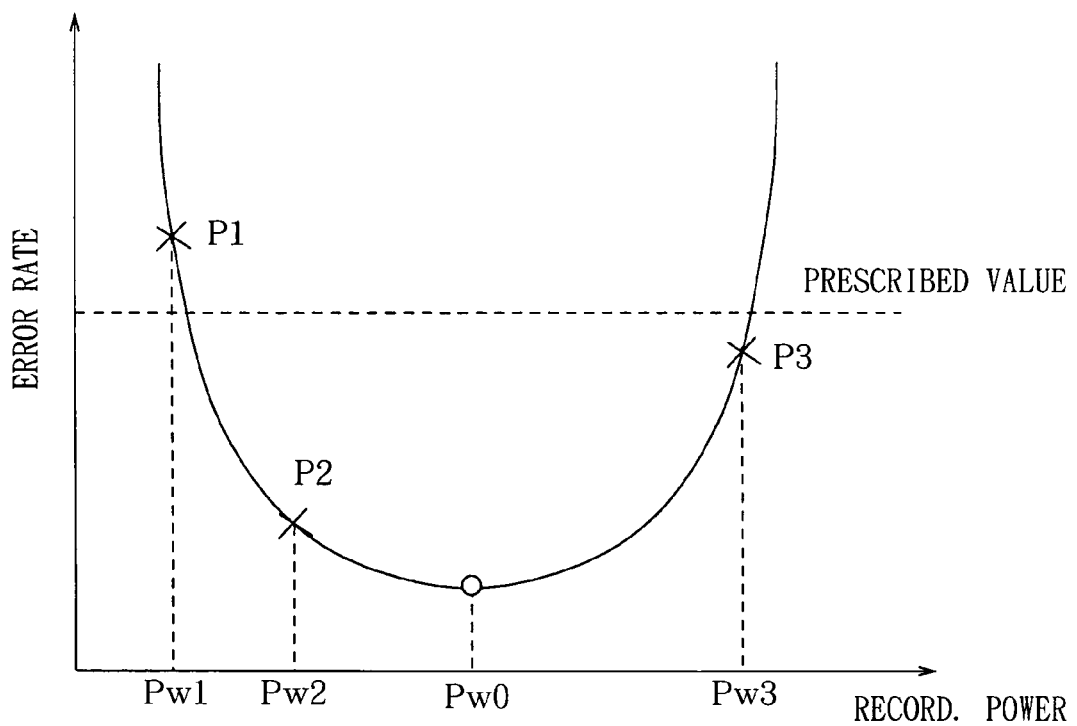
FIG. 16 is a graph illustrating the principle of the recording power optimization.
Figure 17:
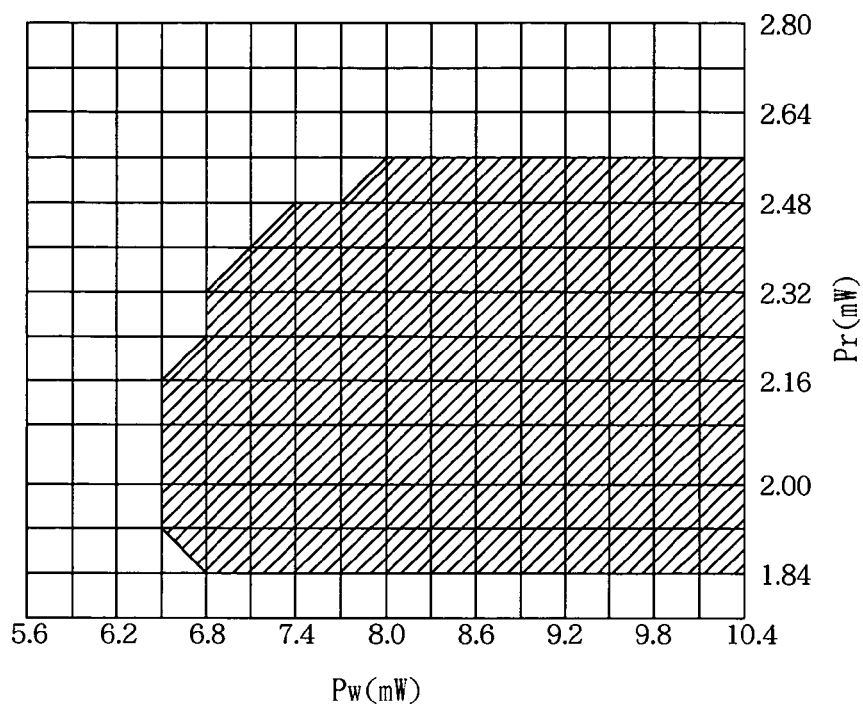
FIG. 17 is a diagram showing the relationship between the recording power and the reproduction power each of which satisfies a prescribed value.

In determining the optimum recording power, usable is a method wherein the relationship between the recording power and the bit error rate is approximated to a quadratic curve, as shown in FIG. 16. For example, signals are recorded with different laser powers for test tracks pre-provided on the disk, thereafter the signals are reproduced with an appropriate laser power, and the error rate for the reproduction signal is detected. As a result, the relationship between a laser power (recording power) and an error rate at each of the three points P1, P2 and P3 is plotted, as shown in FIG. 16. The relationship can be approximately illustrated by a quadratic curve. When the coordinates of at least three points are decided, the quadratic curve is uniquely determined.

Accordingly, a quadratic curve illustrating the relationship between the laser power and the error rate can be determined with use of the values of the laser power and the error rate at the three points, P1, P2 and P3. As shown in FIG. 16, the laser power corresponding to the vertex of the quadratic curve is the optimum laser power Pwo for minimizing the error rate.

Figure 12:
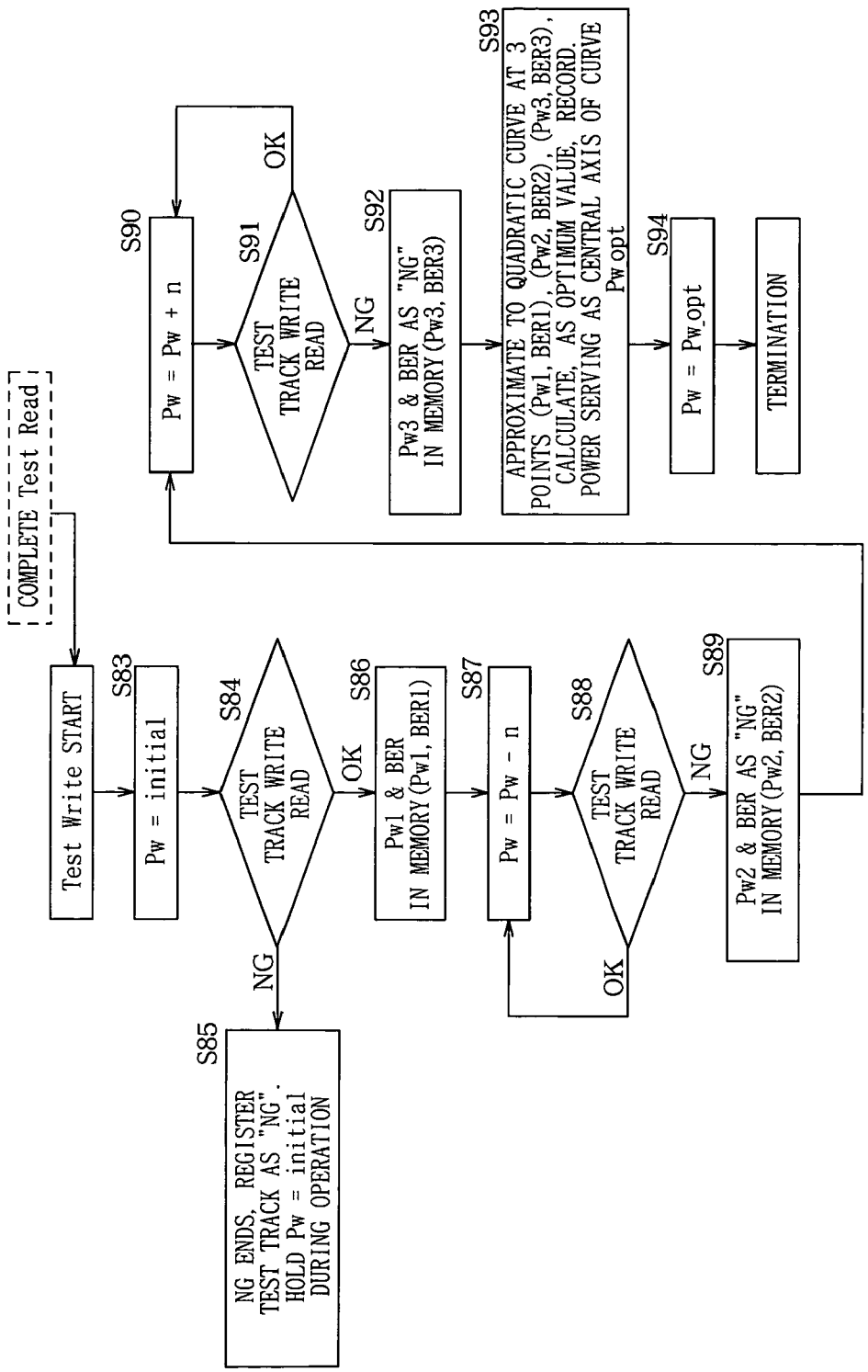
FIG. 12 is a flow chart showing another procedure for recording power optimization.

FIG. 12 shows a procedure for optimizing the recording power based on the quadratic curve approximation. When the test read is completed, and an initial value of recording power which value is not optimum but recordable and the optimum reproduction power are determined, the recording power Pw is set to the initial value in step S83. In step S84 the recording and reproduction are performed for the test tracks, to judge whether the reproduction is allowable. When it is judged that the reproduction is not allowable, step S85 follows to produce a warning notice "NG" and register the test tracks as "NG". During an operation state the recording power is held at the initial value.

On the other hand, when it is judged that the reproduction is allowable in step S84, the recording power Pw1 and the bit error rate BER concerned are stored in the memory. Next in step S87, the recording power Pw is decreased by a predetermined value n, followed by step S88 wherein the recording and the reproduction are performed for the test tracks to judge whether the reproduction is allowable. When it is judged that the reproduction is allowable, step S87 returns to repeat the procedure for decreasing the recording power. As a result when it is judged that the reproduction is not allowable in step S88, step S89 follows to store in the memory the recording power Pw2 and the bit error rate BER which are not allowable for the reproduction.

Subsequently in step S90 the recording power Pw is increased by a predetermined value n, followed by step S91 wherein the recording and the reproduction are performed onto the test tracks to judge whether the reproduction is allowable. When it is judged that the reproduction is allowable, step S90 returns to repeat the procedure for increasing the recording power. As a result, when it is judged the reproduction is not allowable in step S91, step S92 follows to store the recording power Pw3 and the bit error rate BER which are not allowable for the reproduction. Thereafter in step S93 the relationships between the laser powers and the bit error rates are approximated to a quadratic curve with use of the data of the three points (Pw1, BER1), (Pw2, BER2), (Pw3, BER3), to calculate a recording power serving as a central axis of the curve as an optimum value Pw_opt. In step S94 the optimum value Pw_opt is set as the recording power Pw to complete the procedure.

As described above the present invention provides a disk recording-playback device which is adapted to determine, with the small number of steps, the optimum reproduction power which is not dependent on the recording power when the test read is performed for the determination of the optimum reproduction power, and the optimum recording power is uncertain. Further in a subsequent test write for deciding the optimum recording power, with the smaller number of steps, the optimum recording power can be determined by using the optimum reproduction power determined in the test read. The device can set accurately the optimum reproduction power and the optimum recording power with simple steps as a whole. Therefore the device can reproduce or record signals in a short period of time after the system's initiation into operation, and execute signal recording and signal reproduction with high accuracy.

The invention claimed is:

1. A disk recording-playback device wherein a disk is irradiated with a laser beam from an optical head to record signals on the disk or to reproduce signals from the disk, the disk recording-playback device comprising a laser drive circuit for feeding a drive signal to the optical head and adjusting the power of the laser beam irradiated by the optical head, an evaluation data detecting circuit for detecting evaluation data representing quality of a signal reproduction state, a control circuit for controlling operation of the laser drive circuit based on an output of the evaluation data detecting circuit, the control circuit comprising reproduction power optimizing means for optimizing the laser power for signal reproduction, recording power optimizing means for optimizing the laser power for signal recording after the optimization processing by the reproduction power optimizing means is completed, and laser power control means for preparing a laser power control signal so as to make the optimum recording power obtained by the recording power optimizing means or the optimum reproduction power obtained by the reproduction power optimizing means a target value and feeding the signal to the laser drive circuit, the recording power optimizing means comprising:

calculation processing means for setting the laser powers to at least three different values successively, obtaining evaluation data for each laser power and approximating the relationships between the laser powers and the evaluation data at the three points which uniquely determine a quadratic curve, and thereby deriving an optimum recording power corresponding to a vertex of the quadratic curve, the reproduction power optimizing means comprising:

retrieving means for retrieving a lower limit value having a smaller value from two limit values of the laser power wherein evaluation data is beyond a predetermined allowable value, and optimum reproduction power determining means for determining the optimum laser power by adding, to the retrieved lower limit value, a value which is approximately one half of the difference between a maximum reproduction power and a minimum reproduction power within the range wherein the reproduction power is not dependent on the recording power in the relationship between the laser power for signal reproduction and the laser power for signal recording wherein each evaluation data is in the allowable range, wherein the evaluation data is the frequency of occurrence of a bit error included in the reproduced signal.

* * * * *